Dec. 31, 1929.     C. J. WHITE     1,741,801
TIRE TOOL
Filed Nov. 6, 1928
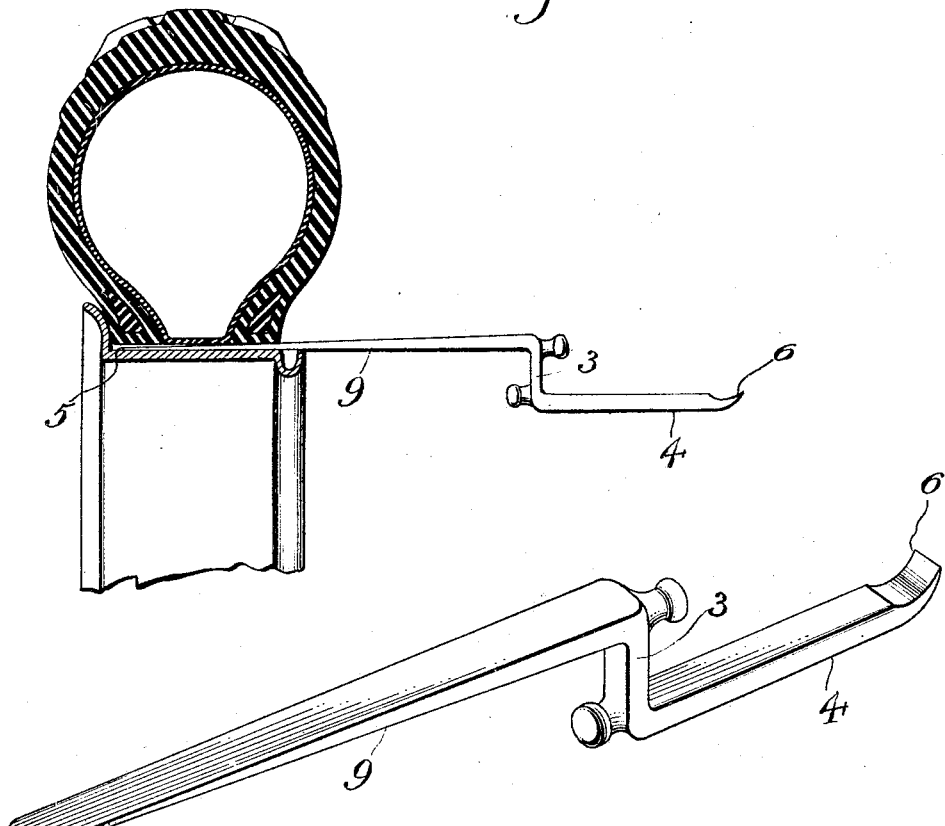
Inventor:
Calvin James White Patented Dec. 31, 1929

1,741,801

UNITED STATES PATENT OFFICE

CALVIN JAMES WHITE, OF ST. IGNACE, MICHIGAN

TIRE TOOL

Application filed November 6, 1928. Serial No. 317,508.

My invention relates particularly to a combination tool for loosening and removing what are known as straight side tires in connection with disc wheel rim construction, having a detachable tire retaining ring which forms a part of the rim itself and more particularly related to a combination tire tool comprising a shank having one end formed into a claw to facilitate the removal of a disc wheel rim tire retaining ring and the other end formed into a tire loosening and removing blade which must be forced endwise with a hammer through between a straight side tire and its supporting disc wheel rim which may have become rusted together.

The object of the improvement is to provide in the above mentioned combination tool, a portion by which the tire loosening and removing blade can be driven with a hammer through between a straight side tire and its supporting disc wheel rim and driven out again.

Referring to the accompanying drawing which forms a part of this application, it will be seen that the improved combination tire tool comprises a short shank (#3) having at its ends, arms number 4 and 9, oppositely extending and at right angles therewith formed integral with the said shank #3. Said arm #4 is provided at its outer end with a claw (#6) to be used to remove a retaining ring (#6) by entering claw #6 in the recess of the retaining ring and prying it loose, that it may be pulled out all the way around by hand. The said arm #9 is gradually tapered flat from the shank 3 to its outer end 5 so that it may be easily forced between a straight side tire and its supporting disc wheel rim.

In many instances a tire becomes rusted fast to its supporting rim and in that case the blade 9 is forced through with a hammer, by striking the shank opposite to end 5. After blade 9 is driven to its desired depth, it will become very tight and hard to pull out. Again, in that case the operator can strike the opposite end of the shank with a hammer and drive the blade out again.

I am aware, that prior to my invention, combination tire tools were made comprising a straight shank having one end formed into a tire loosening blade and the opposite end formed into a claw.

I, therefore do not claim such combination broadly, but, I claim—

In a tire tool the combination of a shank, a transverse arm at one end of the shank tapered into a tire removing blade, and a second transverse arm extending from the other end of the shank and formed into a ring removing claw, each arm having a driving head extending beyond the shank and parallel with the opposing arm whereby either of said arms may be driven in opposite direction.

CALVIN JAMES WHITE.